(12) United States Patent
Toben

(10) Patent No.: US 12,522,401 B2
(45) Date of Patent: Jan. 13, 2026

(54) CONVERTIBLE MODULAR STORAGE, MANAGEMENT AND UTILIZATION SYSTEM AND METHOD

(71) Applicant: CHILOMA, LLC, Phoenix, AZ (US)

(72) Inventor: John Toben, Phoenix, AZ (US)

(73) Assignee: CHILOMA, LLC, Phoenix, AZ (US)

(*) Notice: Subject to any disclaimer, the term of this patent is extended or adjusted under 35 U.S.C. 154(b) by 7 days.

(21) Appl. No.: 18/766,915

(22) Filed: Jul. 9, 2024

(65) Prior Publication Data

US 2024/0359869 A1 Oct. 31, 2024

Related U.S. Application Data

(63) Continuation of application No. 16/930,065, filed on Jul. 15, 2020, now Pat. No. 12,030,691.

(60) Provisional application No. 62/874,260, filed on Jul. 15, 2019.

(51) Int. Cl.
*B65D 21/08* (2006.01)

(52) U.S. Cl.
CPC .................. *B65D 21/083* (2013.01)

(58) Field of Classification Search
CPC .............. B65D 21/083; B65D 11/1866; B65D 11/1873; B65D 21/02; B65D 21/0201; B65D 21/0233; B65D 25/16; B65D 9/34; B65D 9/12; B65D 2313/04
USPC ....................... 220/4.28, 23.87, 23.88, 23.89
See application file for complete search history.

(56) References Cited

U.S. PATENT DOCUMENTS

| | | | | |
|---|---|---|---|---|
| 3,692,201 | A * | 9/1972 | Garduna | B65D 9/34 217/65 |
| 10,173,292 | B2 * | 1/2019 | Fullerton | B23P 15/001 |
| 2013/0213960 | A1 * | 8/2013 | Cook | A47G 19/2205 220/23.87 |
| 2018/0170615 | A1 * | 6/2018 | Jacobson | A47J 27/12 |

* cited by examiner

*Primary Examiner* — Andrew D Perreault

(57) ABSTRACT

A modular storage container system includes a substantially rectangular storage container defining an interior volume therein having a first plurality of magnets included on a first interior surface of the substantially rectangular storage container and a second plurality of magnets disposed upon a second interior surface within the interior volume of the substantially rectangular storage container. A plurality of internal magnetized storage containers each define a second interior volume. The plurality of internal magnetized storage containers is configured to be received within said interior volume defined by said substantially rectangular storage container. The plurality of internal magnetized storage containers is further configured to engage with at least one of the first plurality of magnets and the second plurality of magnets to secure the plurality of internal magnetized storage containers in a removably fixed first configuration and a removably fixed second configuration within the interior volume defined by the substantially rectangular storage container. A lid assembly encloses a top of the interior volume of the substantially rectangular container. A third plurality of magnets associated with the lid assembly are positioned to be attracted to at least a portion of the first plurality of magnets and at least a portion of the second plurality of magnets to secure a connection between the lid assembly and the substantially rectangular container.

20 Claims, 13 Drawing Sheets

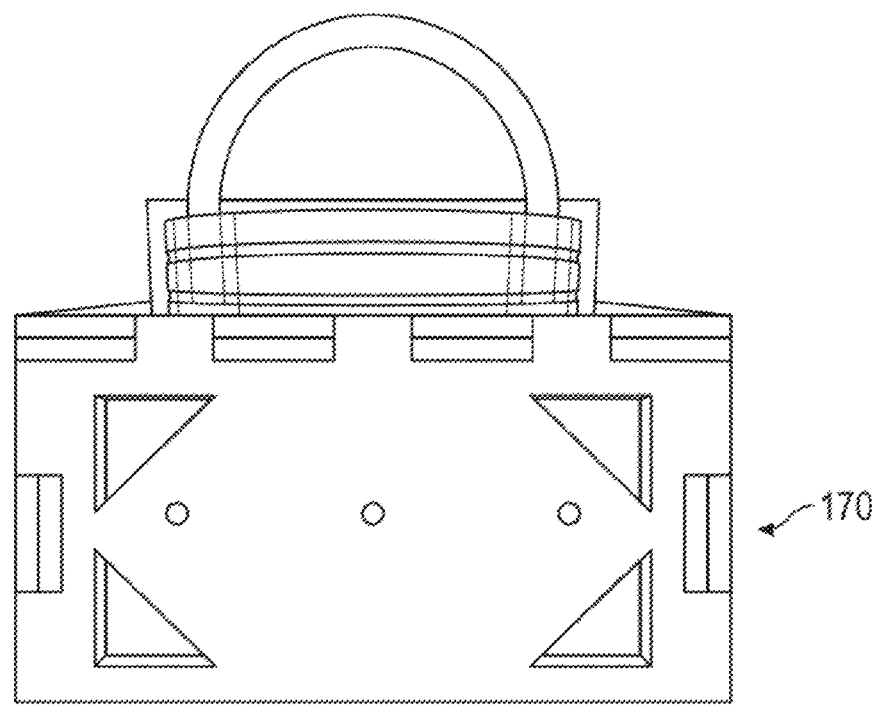
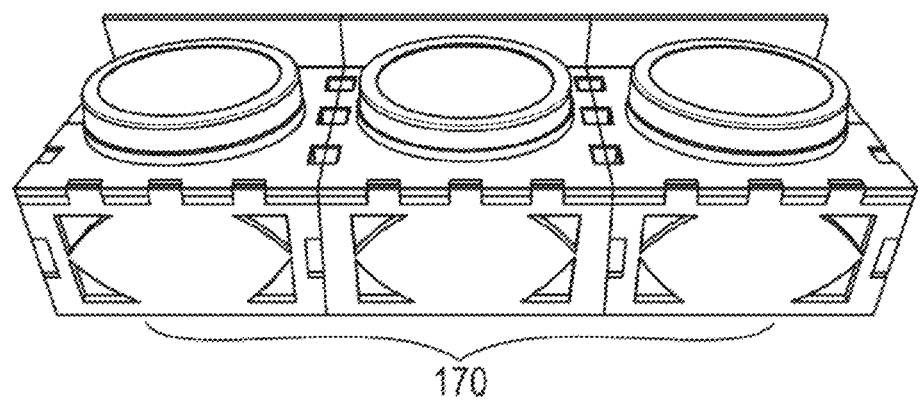
FIG. 13

CONVERTIBLE MODULAR STORAGE, MANAGEMENT AND UTILIZATION SYSTEM AND METHOD

STATEMENT OF PRIORITY

The present application is a continuation of U.S. patent application Ser. No. 16/930,065, titled "CONVERTIBLE MODULAR STORAGE, MANAGEMENT AND UTILIZATION SYSTEM AND METHOD" as filed on Jul. 15, 2020, which claims the benefit of U.S. Provisional Application No. 62/874,260, titled "CONVERTIBLE MODULAR STORAGE, MANAGEMENT AND UTILIZATION SYSTEM AND METHOD" as filed on Jul. 15, 2019, the disclosures of which are incorporated by reference herein in their entirety.

BACKGROUND OF THE INVENTION

Field of the Invention

The present invention relates to container systems for housing and storing various contents.

Background of the Invention

Presently available container systems present numerous design flaw and can even create problems for their users. This deters the user from enjoying the process of organizing, using, and displaying their stored products in the most efficient and user-friendly manner. Manufacturing methods and design aspects of presently available containers either lead to cheap quality or such high quality that manufacturing costs that result in prices that out-price the majority of the consumer market.

Conventional containers available on the market today, regardless of quality or type are stagnant, closed-system container designs, meaning they lack the capability for consumers to customize, change, grow, and adapt their container to the ideal set up for their needs and budget at any given time.

Many of these conventional containers do not utilize the full capabilities a container has to offer. This can be seen in the design of many conventional lids. Lids do not close well enough or close with too much difficulty; locking or securing mechanisms are too often easily broken or are tedious to use. Additionally, the lid serves little to no purpose at all other than to close off the container.

Moreover, it can be difficult to find the right container for each storage need and often consumers are left to wander in container stores simply in hopes of finding an effective container for their needs, with little to no choice in customization to enhance the design, function, and efficiency. Even if the consumer finds a solid match for their needs; in the event they should need a like-type container as storage needs increase or change, it is unlikely the consumer will be able to find the same design, style, or shape even in as little as six months later.

Most containers, outside of jewelry and cigar boxes, even if given added style are not meant to serve as ornamentation or an interactive purposes in the user's daily life, they are simply put away out of sight.

Present user interaction with containers consists of placing objects or other smaller containers in a single container and moving them around to get it all to fit suitably. This game also forces the user to analyze what items to cover with other components, reducing visibility and making additional work for the user to remove them when desired. This task becomes even more difficult when the containers need to be transported. The goal then becomes to pack them in a way that they will not shift around and have weight stacked and stored on top of them.

SUMMARY OF THE INVENTION

In view of the foregoing, it would be advantageous to consumers of container systems to provide a container system that is more easily adaptable and interchangeable between various configurations.

The present inventors here disclose a novel and unobvious apparatus and associated method for use in container systems that meet at least each of the preceding objectives.

Various embodiments of the present invention are an assembly that includes reversibly-attachable, magnetically-engaged components. These components allow for user-customizable container systems that may vary in dimensions and internal arrangement. The ability to interchange the components further improves upon conventional container systems as it provides additional flexibility in terms of aesthetic design and functional needs. Furthermore, the use of such components allows for the incorporation of various add-ons within a container system and for a lid that may itself be configured to serve specialized purposes.

BRIEF DESCRIPTION OF THE DRAWINGS

FIG. 13 depicts an add-on assembly for a container assembly in accordance with one embodiment of the present container system.

DETAILED DESCRIPTION

Figure 1:
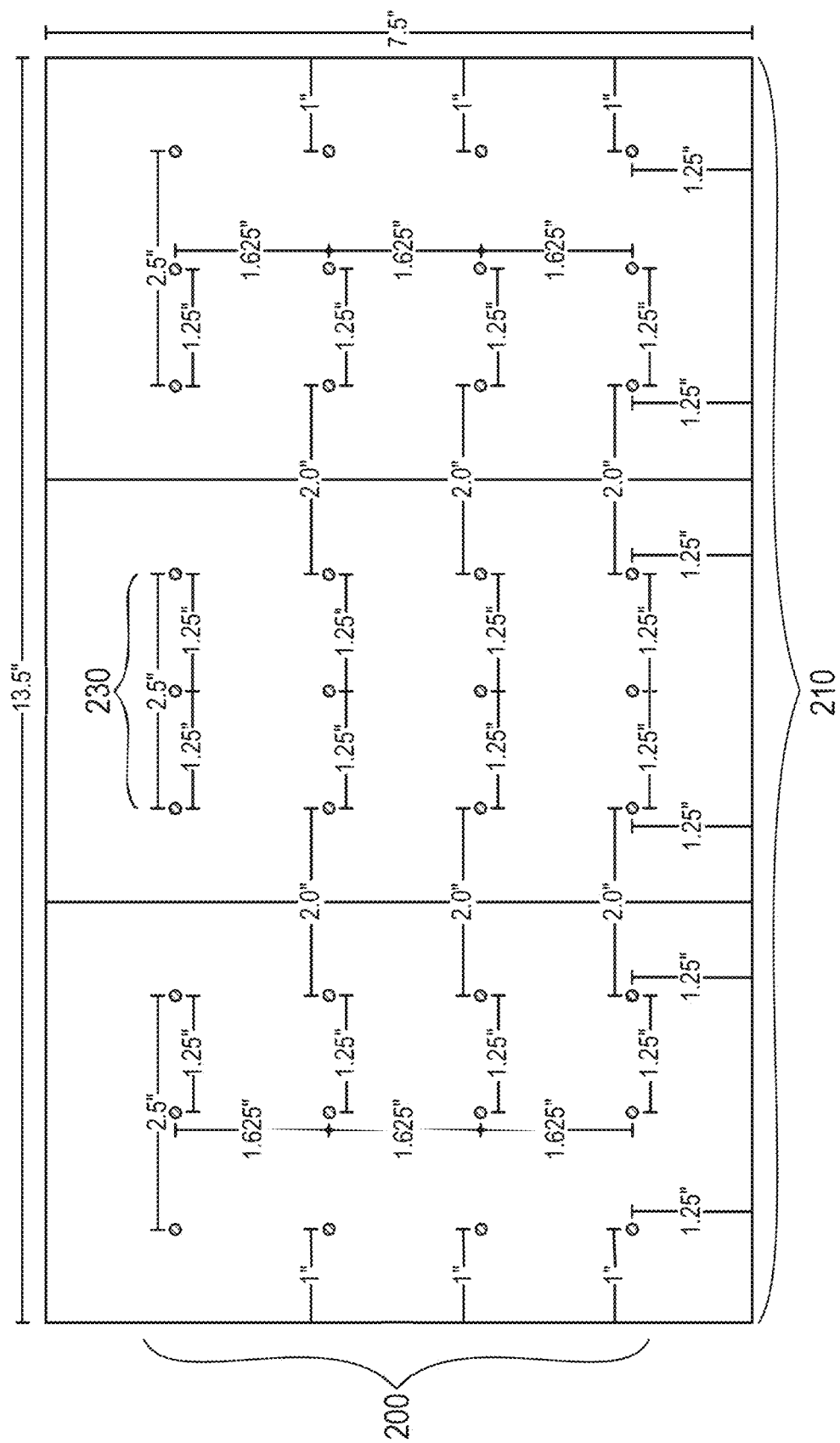
FIG. 1 depicts the magnetic grid on a first side of an assembly panel in accordance with one embodiment of the present container system.

Embodiments of a modular, multi-function container system 1 of the present invention shall be discussed in reference to FIGS. 1-13. Though other, undepicted assemblages may be made by those using the present system, a preferred embodiment includes: a base assembly 100 comprising a front assembly 110 having a magnetic grid, a rear assembly 120 having a corresponding magnetic grid, a first side assembly 130, a second side assembly 140, and a bottom panel 150 that, when combined, define an interior volume 180.

The magnetic grids may comprise individual magnets 230 in various arrangements or configurations. Such magnets may be nickel plated neodymium magnet cylinders. Such cylinders may be axially magnetized and have a first polarized end 210 and a second polarized end 220 wherein said first and second polarized ends have opposite polarities. The magnets may be approximately ⅛ in. in diameter and have a strength of between approximately 0.5-1.5 lbs.

Figure 2:
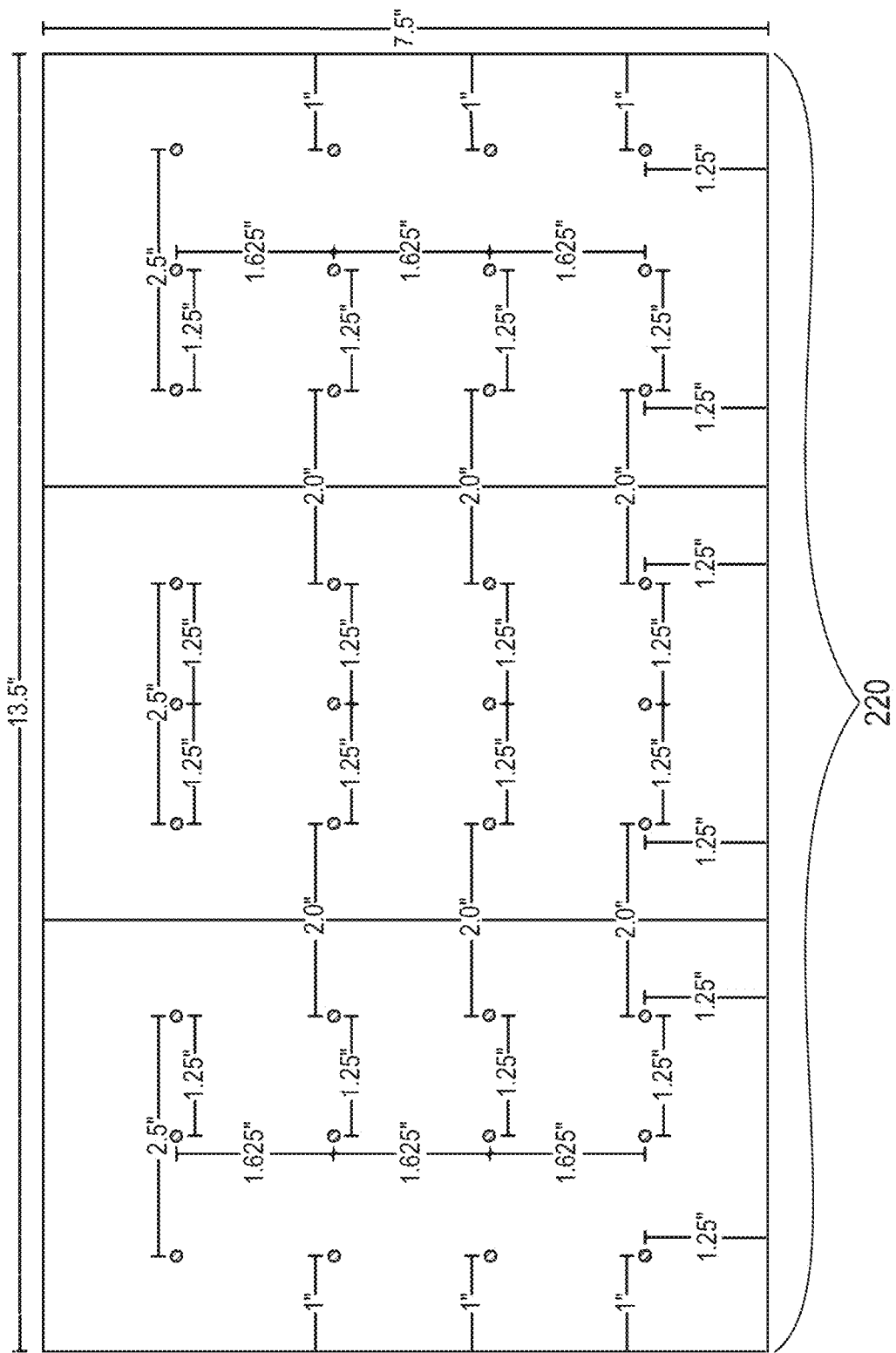
FIG. 2 depicts the magnetic grid on a second side of an assembly panel in accordance with one embodiment of the present container system.

FIG. 2 depicts an exemplary magnetic grid 200 that may be incorporated into a front panel of the front assembly in one embodiment of a container assembly. The panel may be composed of any material conventionally known in the art for constructing containers including birch plywood. The panel may have a thickness of between approximately ⅛-¼ in. Those of ordinary skill in the art would recognize that the dimensions may vary from those set forth in FIG. 2 as may the relative spatial arrangement of the individual magnets. When combined with the other container assembly components, the first polar end of all magnets positioned in the front panel of a front assembly depicted by FIG. 2 will face outward relative the interior volume of the container assembly while the second polar end of said magnets face inward (shown in FIG. 3).

A corresponding magnetic grid may be incorporated into a rear panel of the rear assembly 120 of a container assembly 1. When combined with the other container assembly components, the first polar end 210 of all magnets positioned in the rear panel of a rear assembly 120 will face inward relative the interior volume 180 of the container assembly 1 while the second polar end 220 of said magnets will face outward. By orienting the magnets in this way, the magnetic grids of the front and rear panels create a field in which other magnetized components are compartments may be inserted and thereby secured within the container assembly's interior volume.

The front and rear assemblies may each further comprise an outer decorative layer is attached to the outward-facing surface of the front and rear panels, respectively. This decorate layer may be composed of any material conventionally known in the art such as birch plywood, extruded acrylic, or silicone.

The first and second side assemblies, 130 and 140, respectively, may similarly each comprise a side panel and decorate layer to maintain a consistent appearance across all sides of the container assembly.

Figure 3:
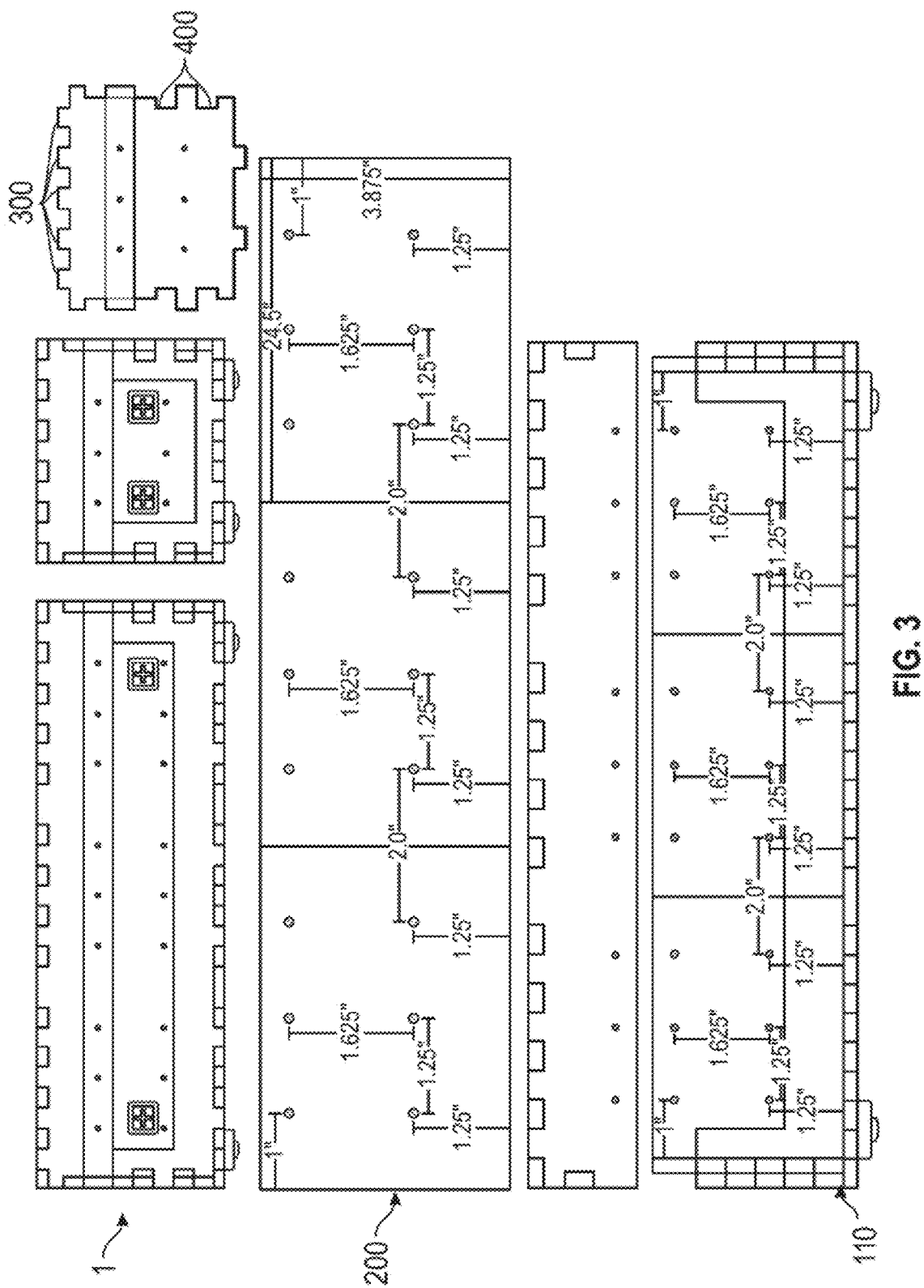
FIG. 3 depicts the front assembly in accordance with one embodiment of the present container system.
Figure 4:
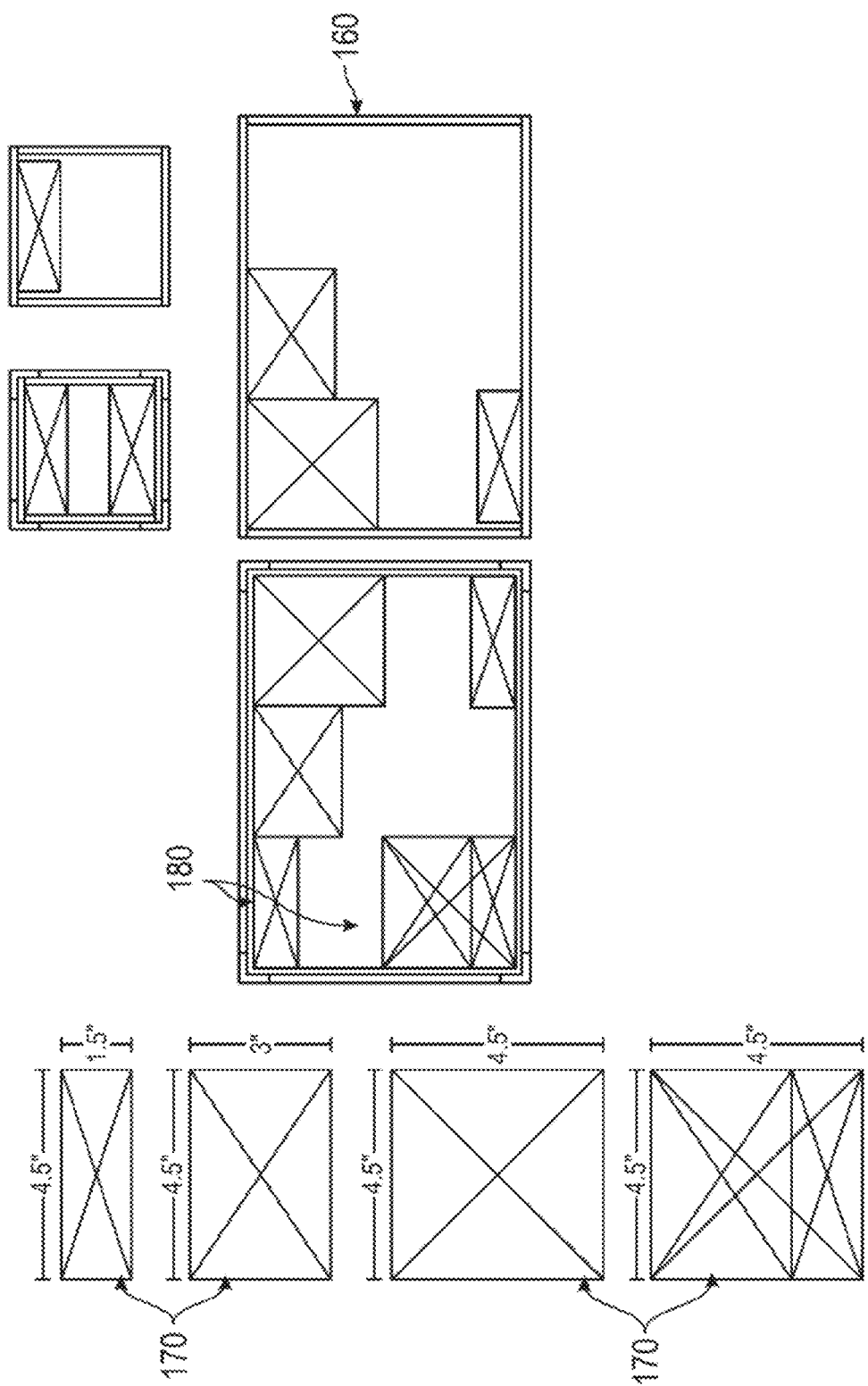
FIG. 4 is a top view of a modular container housing multiple add-on components in accordance with one embodiment of the present container system.
Figure 5:
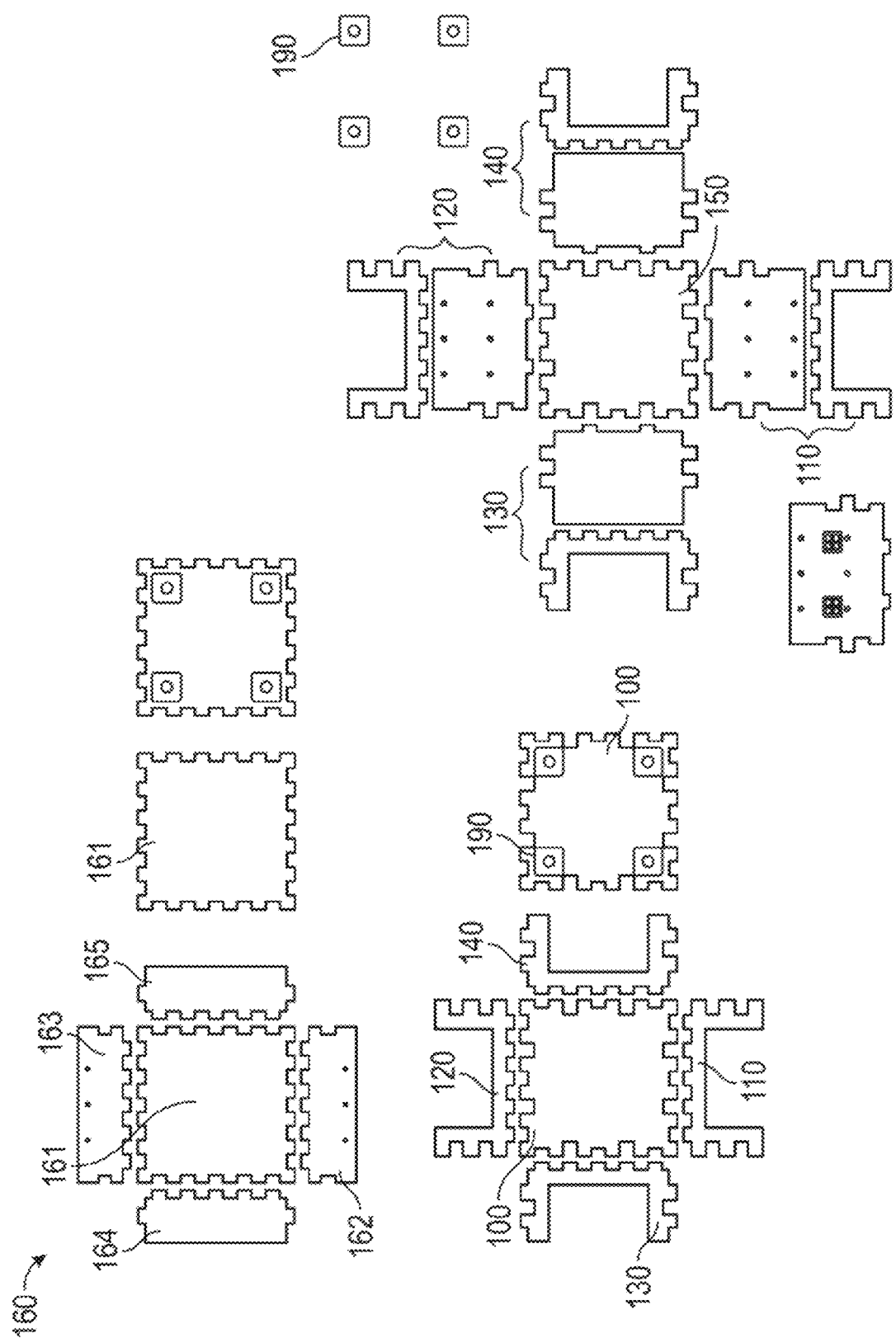
FIG. 5 depicts individual components for a container assembly in accordance with one embodiment of the present container system.
Figure 6:
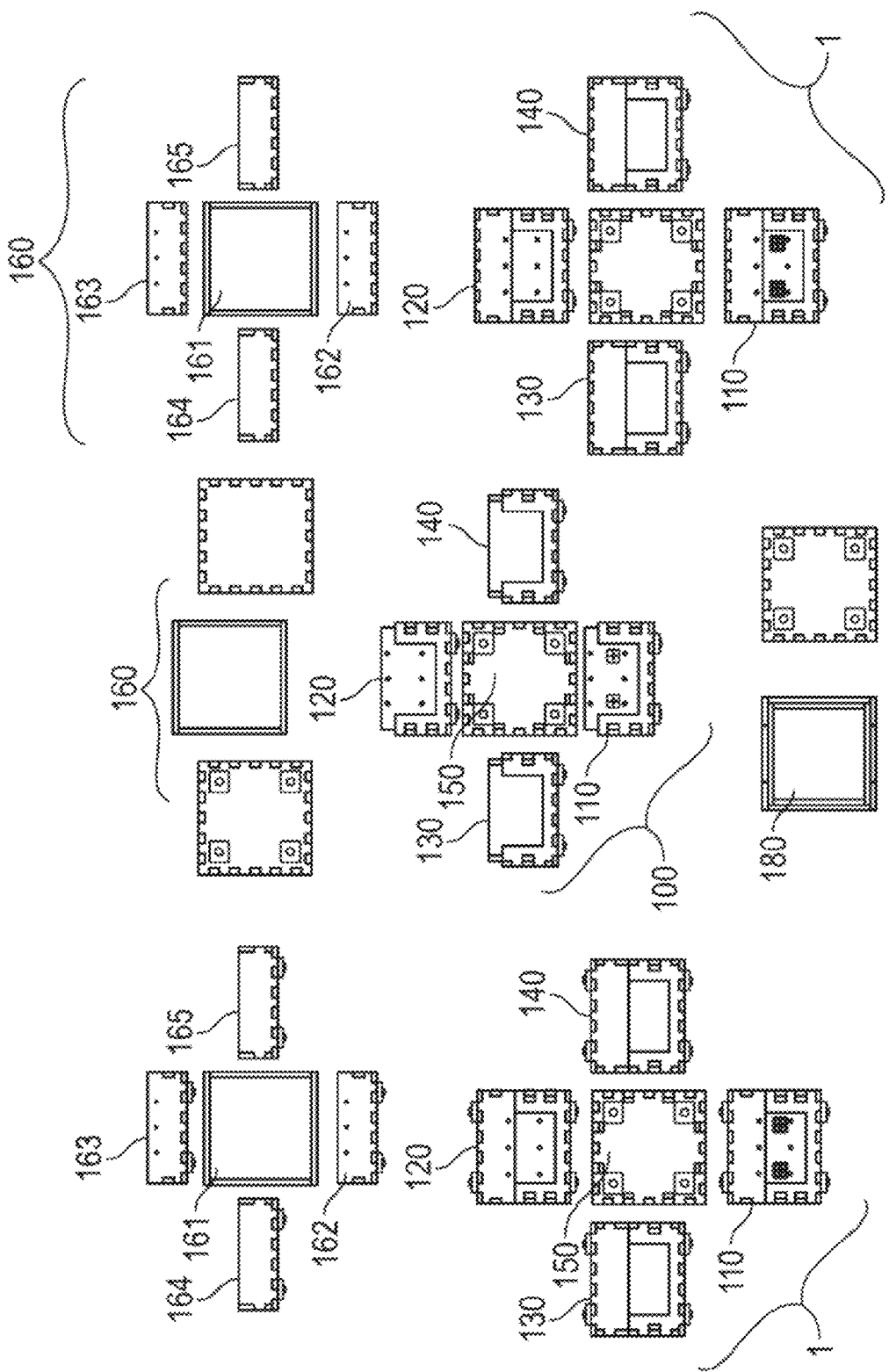
FIG. 6 depicts several views of the container assembly of FIG. 5.
Figure 7:
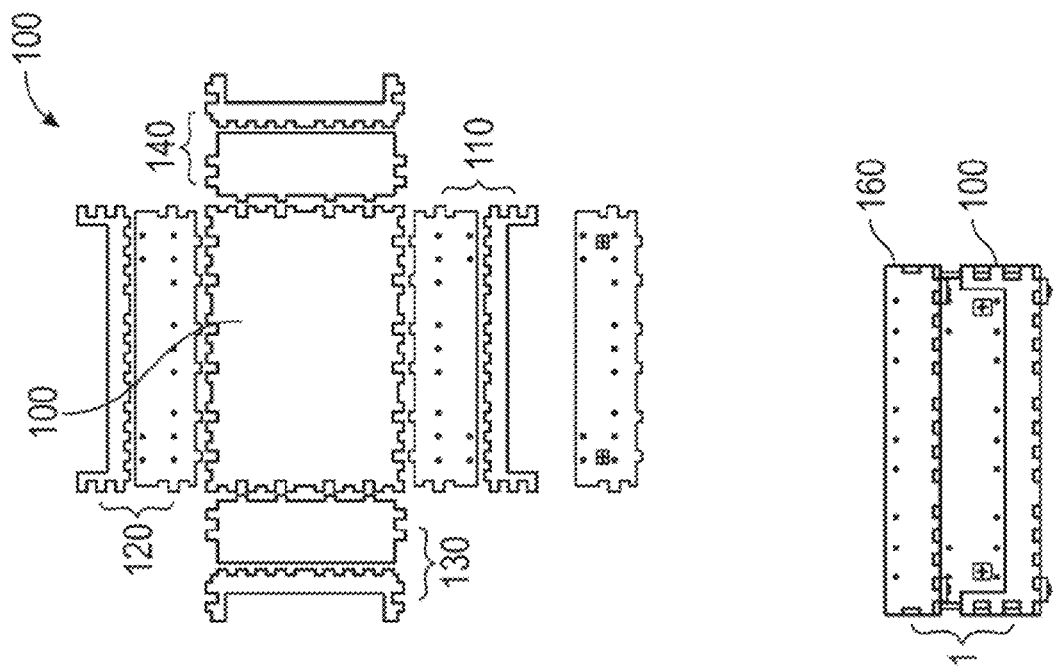
FIG. 7 depicts individual components for another container assembly in accordance with one embodiment of the present container system.
Figure 8:
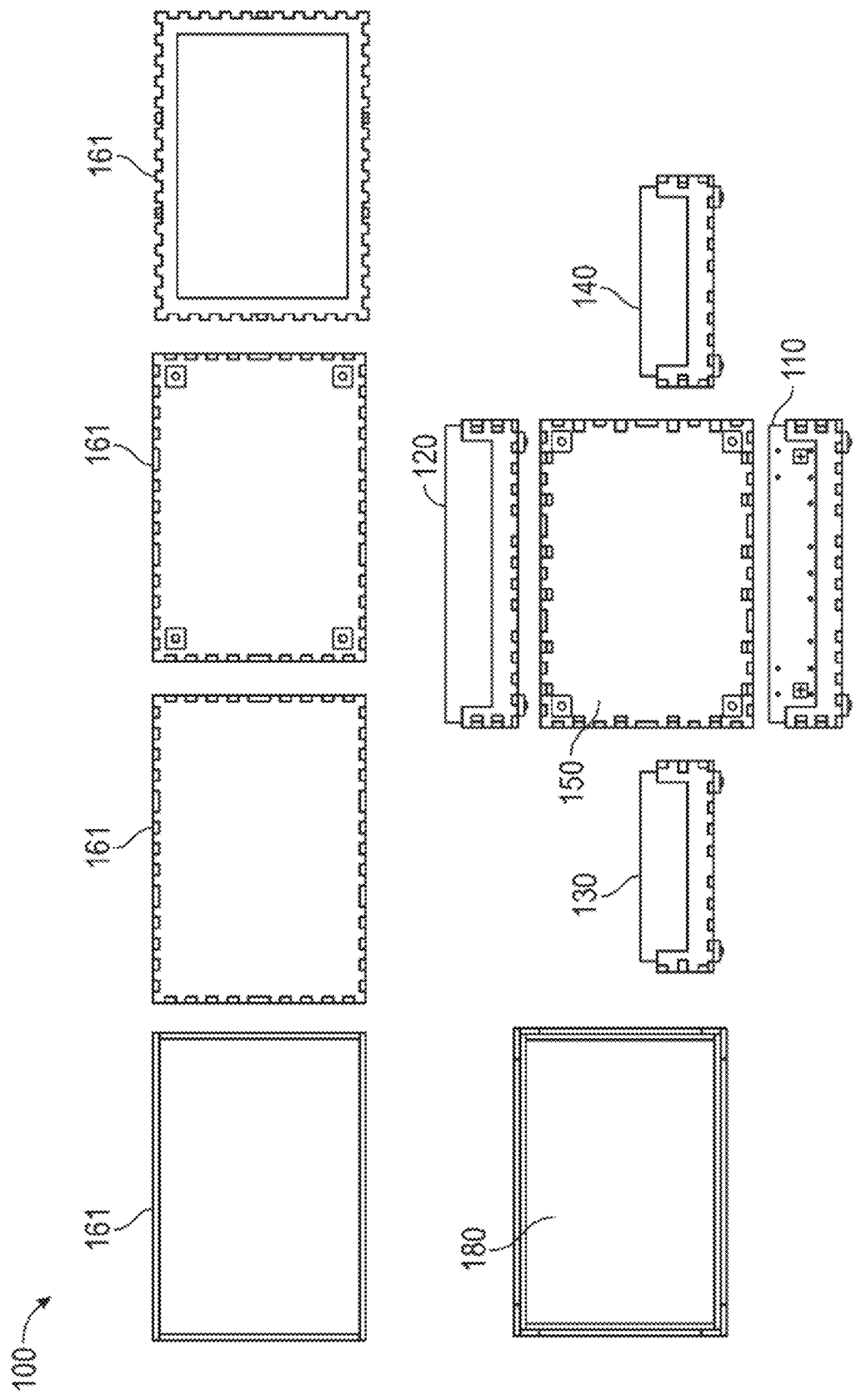
FIG. 8 depicts several views of the container assembly of FIG. 7.
Figure 9:
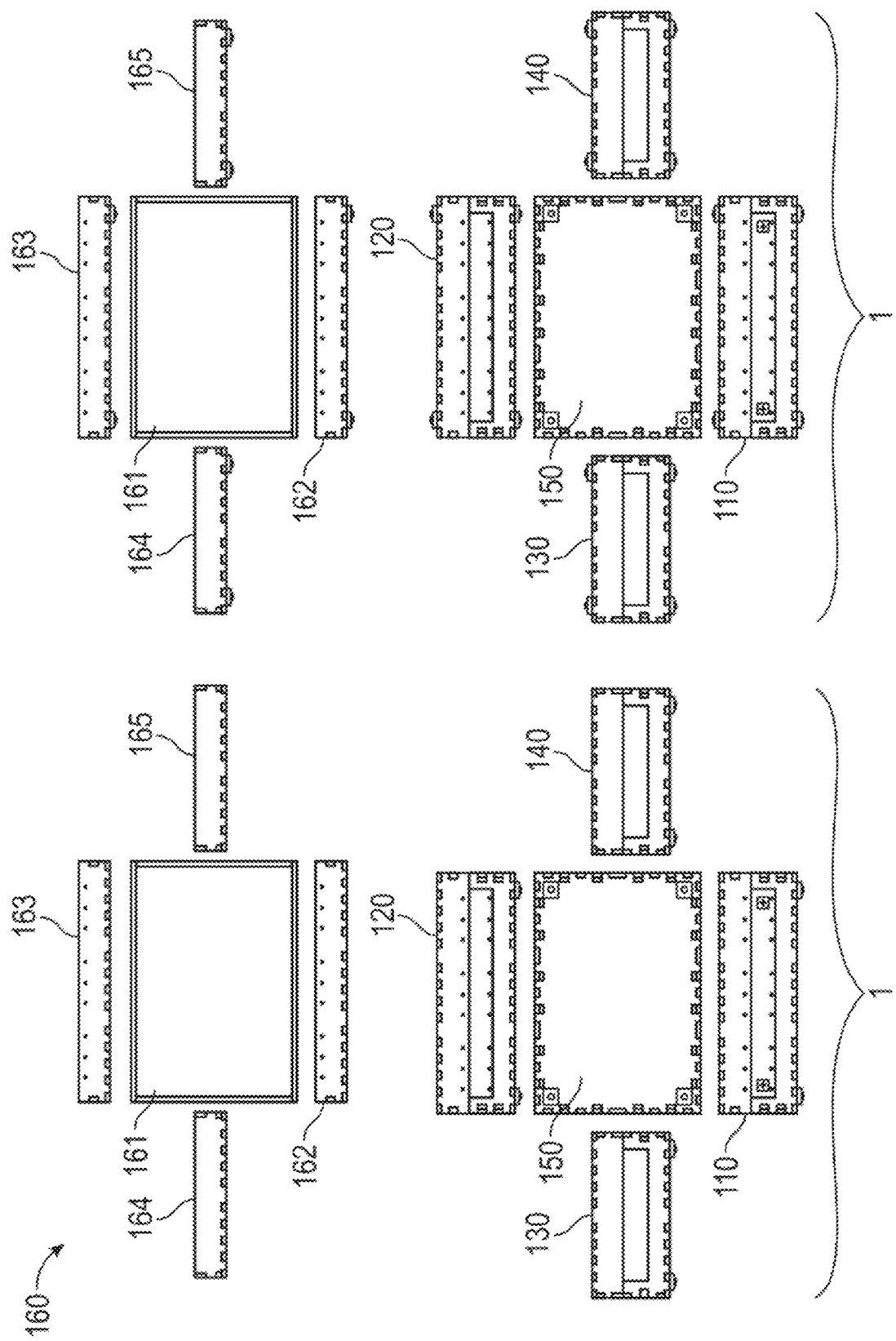
FIG. 9 depicts additional views of the container assembly of FIG. 7.

Each of the front assembly, rear assembly, first side assembly, second side assembly, and bottom panel may be configured for reversible engagement with each other. As depicted in FIGS. 3, 5, and 6, a series of corresponding protrusions 300 and recesses 400 may be formed into the edges of each assembly such that the edges of each assembly may interlock with the corresponding edges of the other assembles in order to form a substantially rectangular container defining an interior volume when combined. In certain embodiments, rubber feet 190 (or feet composed of other materials conventionally known in the art) may be affixed to said bottom panel to minimize scraping of the bottom panel when placed on a surface.

In some embodiments, the container assembly may further comprise a lid assembly 160. The lid assembly may comprise a top panel 165, a front lid assembly 161, a rear lid assembly 162, a first lid side assembly 163, and a second lid side assembly 164. The front and rear lid assemblies may each have a magnetic grid wherein the magnets within each said grid are oriented such that, when the lid assembly 160 is placed on top of the base assembly 100, the lid assembly's magnets are attracted to the corresponding base assembly's magnets to provide a secured connection between the lid and base assemblies.

Figure 10:
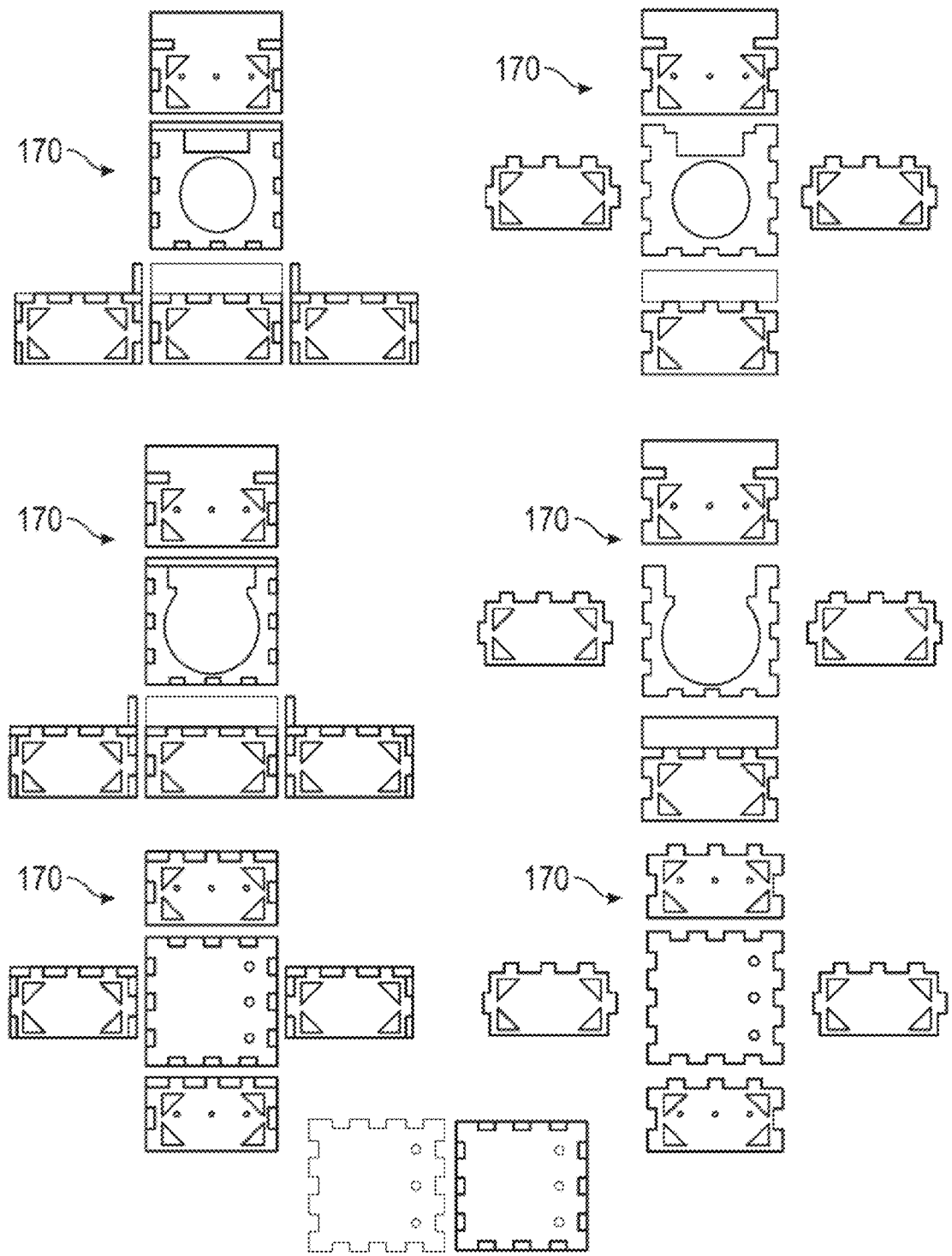
FIG. 10 depicts an add-on assembly for a container assembly in accordance with one embodiment of the present container system.
Figure 11:
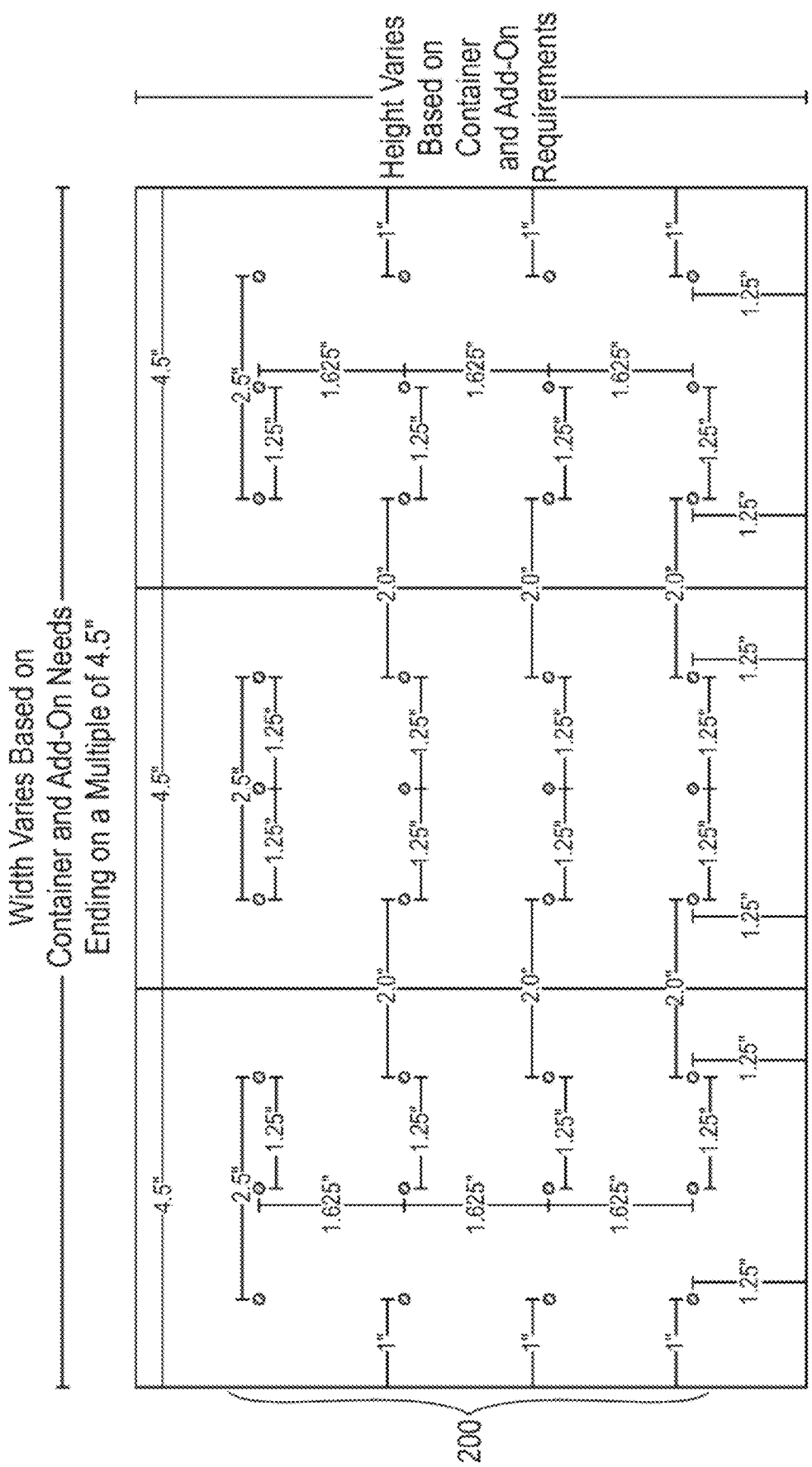
FIG. 11 depicts a magnetic grid for expanded container assemblies in accordance with one embodiment of the present container system.
Figure 12:
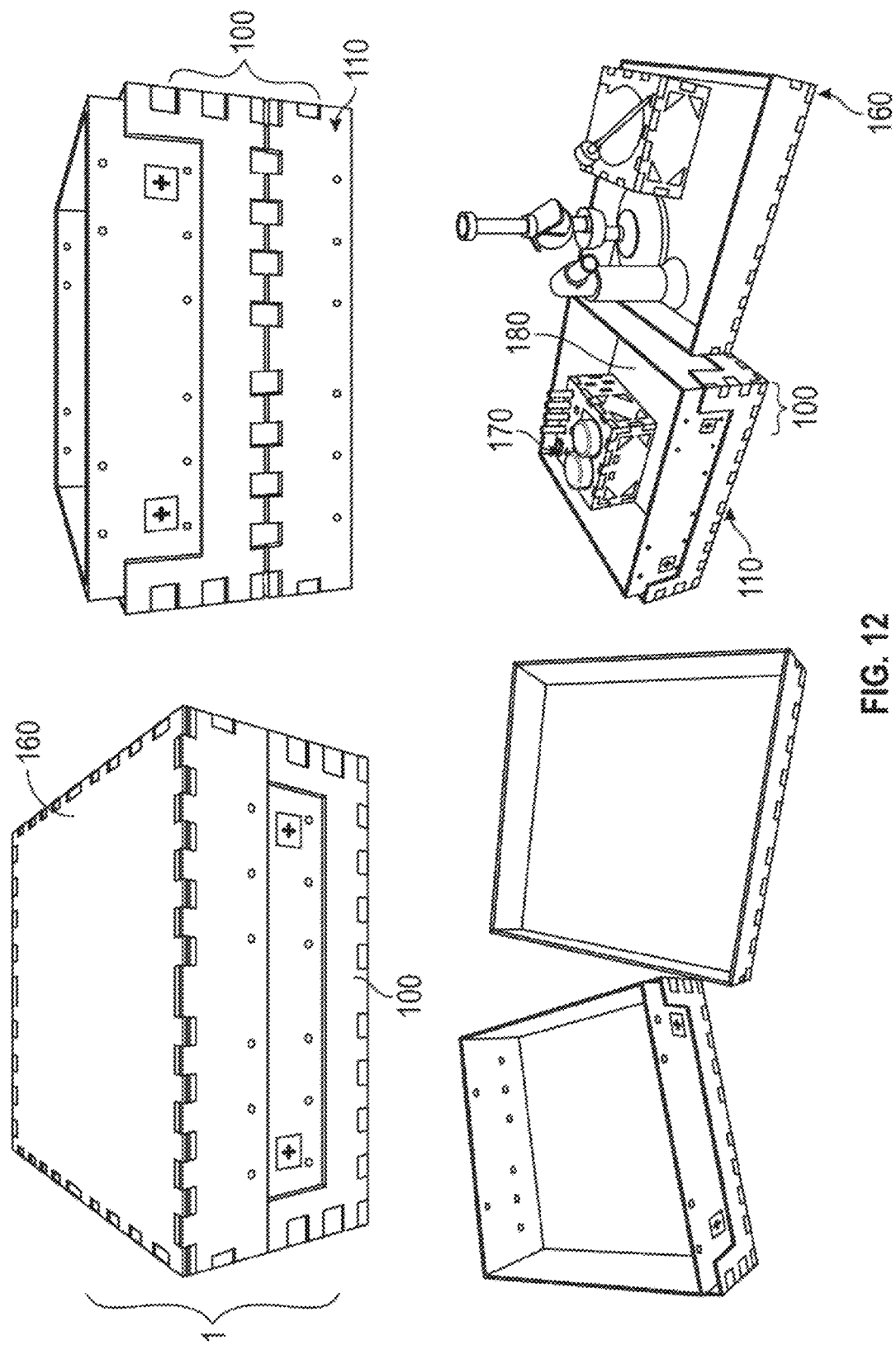
FIG. 12 depicts a container assembly in accordance with one embodiment of the present container system.

In additional embodiments, the container assembly may further comprise an add-on assembly 170 defining an interior volume that is less than the interior volume 180 of the base assembly. The add-on assembly 170 may have a magnetic grid incorporated into one or more sides whereby said add-on assembly may be secured to the interior of the base assembly through a magnetic connection between its magnetic grid and one or more of the base assembly's magnetic grids. As depicted in FIGS. 10 and 13, an add-on assembly may comprise a top panel featuring an opening configured to receive an object such as a jar.

Moreover, the magnetic grids present in the front and rear assemblies of the base assembly 100 allow for quick and easy customizability of the container assembly through reversible attachment of magnetized labels or ornaments to the exterior (or interior) of the base assembly.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the claims that ultimately are allowed upon prosecution of the corresponding nonprovisional application will cover such modifications that fall within the scope of the invention.

What is claimed is:

1. A modular storage container system comprising:
   a front panel;
   a first plurality of magnets are disposed in a first grid pattern on a first side of the front panel;
   a rear panel;
   a second plurality of magnets are disposed thereon in a second grid pattern on a first side of the rear panel;
   a first side panel;
   a second side panel
   a bottom panel;
   wherein the front panel, the rear panel, the first side assembly panel, the second side assembly panel and the bottom panel are connected to form a substantially rectangular storage container defining an interior volume therein accessible via an opening defined in a top surface of the substantially rectangular storage container having the first plurality of magnets and the second plurality of magnets disposed within the interior volume of the substantially rectangular storage container; and
   a plurality of internal magnetized substantially rectangular storage containers defining a second interior volume, wherein said plurality of internal magnetized substantially rectangular storage container are received within said interior volume defined by the substantially rectangular storage container, wherein said plurality of internal magnetized substantially rectangular storage containers-are further engaged with at least one of the first plurality of magnets and the second plurality of magnets to secure the plurality of internal magnetized substantially rectangular storage containers in a removably fixed first configuration within the interior volume of the substantially rectangular storage container and a removably fixed second configuration within the interior volume of the substantially rectangular storage container;
a lid assembly for enclosing a top of the interior volume of the substantially rectangular container; and
a third plurality of magnets associated with the lid assembly positioned to be attracted to at least a portion of the first plurality of magnets and at least a portion of the second plurality of magnets to secure a connection between the lid assembly and the substantially rectangular container.

2. The modular storage container system of claim 1, wherein the first configuration and the second configuration are connected with at least one of the front assembly and the rear assembly within the interior volume defined by the substantially rectangular storage container.

3. The modular container system of claim 1, wherein the plurality of internal magnetized substantially rectangular storage containers may each be placed within the substantially rectangular storage container at a same time.

4. The modular container system of claim 1, wherein the front panel, the back panel, the first side panel, the second side panel and the bottom panel each comprise single wall panels.

5. The modular container system of claim 1, wherein the plurality of internal magnetized substantially rectangular storage containers further include a third plurality of magnets on at least one exterior surface each of the plurality of the internal magnetized substantially rectangular storage containers.

6. The modular container system of claim 1, wherein the first plurality of magnets have a first pole oriented away from the interior volume of the substantially rectangular storage container and a second pole oriented toward the interior volume of the substantially rectangular storage container, further wherein the secondi plurality of magnets have the first pole oriented toward the interior volume of the substantially rectangular storage container and the second pole oriented away form the interior volume of the substantially rectangular storage container to create a field in which the plurality of internal magnetized substantially rectangular storage containers may be secured within the interior volume of the substantially rectangular storage container.

7. The modular container system of claim 1, wherein the third plurality of magnets are disposed in a third grid pattern such that the third grid pattern is attracted to the first grid pattern and the second grid pattern to provide a secure connection between the lid assembly and the substantially rectangular storage container when the lid assembly is placed on top of the substantially rectangular container.

8. A modular storage container system comprising:
a substantially rectangular storage container defining an interior volume therein having a first plurality of magnets included on a first interior surface of the substantially rectangular storage container and a second plurality of magnets disposed upon a second interior surface within the interior volume of the substantially rectangular storage container; and
a plurality of internal magnetized storage containers each defining a second interior volume, wherein said plurality of internal magnetized storage containers is configured to be received within said interior volume defined by said substantially rectangular storage container, wherein said plurality of internal magnetized storage containers is further configured to engage with at least one of the first plurality of magnets and the second plurality of magnets to secure the plurality of internal magnetized storage containers in a removably fixed first configuration and a removably fixed second configuration within the interior volume defined by the substantially rectangular storage container, wherein the plurality of internal magnetized storage containers may each be placed within the substantially rectangular storage container at a same time;
a lid assembly for enclosing a top of the interior volume of the substantially rectangular container; and
a third plurality of magnets associated with the lid assembly positioned to be attracted to at least a portion of the first plurality of magnets and at least a portion of the second plurality of magnets to secure a connection between the lid assembly and the substantially rectangular container.

9. The modular storage container system of claim 8, wherein the first configuration and the second configuration are connected with at least one of the front assembly and the rear assembly within the interior volume defined by the substantially rectangular storage container.

10. The modular container system of claim 8, wherein the plurality of internal magnetized substantially rectangular storage containers may each be placed within the substantially rectangular storage container at a same time.

11. The modular container system of claim 8, wherein the front panel, the back panel, the first side panel, the second side panel and the bottom panel each comprise single wall panels.

12. The modular container system of claim 8, wherein the plurality of internal magnetized substantially rectangular storage containers further include a third plurality of magnets on at least one exterior surface each of the plurality of the internal magnetized substantially rectangular storage containers.

13. The modular container system of claim 8, wherein the first plurality of magnets have a first pole oriented away from the interior volume of the substantially rectangular storage container and a second pole oriented toward the interior volume of the substantially rectangular storage container, further wherein the secondi plurality of magnets have the first pole oriented toward the interior volume of the substantially rectangular storage container and the second pole oriented away form the interior volume of the substantially rectangular storage container to create a field in which the plurality of internal magnetized substantially rectangular storage containers may be secured within the interior volume of the substantially rectangular storage container.

14. The modular container system of claim 8, wherein the third plurality of magnets are disposed in a third grid pattern such that the third grid pattern is attracted to the first grid pattern and the second grid pattern to provide a secure connection between the lid assembly and the substantially rectangular storage container when the lid assembly is placed on top of the substantially rectangular container.

15. A modular storage container system comprising:
a substantially rectangular storage container defining an interior volume therein having a first plurality of magnets included on a first interior surface of the substantially rectangular storage container and a second plurality of magnets disposed upon a second interior surface within the interior volume of the substantially rectangular storage container;

a plurality of internal storage containers each defining a second interior volume therein and each having a third plurality of magnets included on at least one exterior surface of the internal storage container, wherein said plurality of internal magnetized storage containers is configured to be received within said interior volume defined by said substantially rectangular storage container, wherein said third plurality of magnets is further configured to engage with at least one of the first plurality of magnets and the second plurality of magnets to secure the plurality of internal magnetized storage containers in a removably fixed first configuration and a removably fixed second configuration within the interior volume defined by the substantially rectangular storage container;

a lid assembly for enclosing a top of the interior volume of the substantially rectangular container; and a third plurality of magnets associated with the lid assembly positioned to be attracted to at least a portion of the first plurality of magnets and at least a portion of the second plurality of magnets to secure a connection between the lid assembly and the substantially rectangular container.

16. The modular container system of claim 15, wherein the plurality of internal magnetized substantially rectangular storage containers may each be placed within the substantially rectangular storage container at a same time.

17. The modular container system of claim 15, wherein the front panel, the back panel, the first side panel, the second side panel and the bottom panel each comprise single wall panels.

18. The modular container system of claim 15, wherein the plurality of internal magnetized substantially rectangular storage containers further include a third plurality of magnets on at least one exterior surface each of the plurality of the internal magnetized substantially rectangular storage containers.

19. The modular container system of claim 15, wherein the first plurality of magnets have a first pole oriented away from the interior volume of the substantially rectangular storage container and a second pole oriented toward the interior volume of the substantially rectangular storage container, further wherein the secondi plurality of magnets have the first pole oriented toward the interior volume of the substantially rectangular storage container and the second pole oriented away form the interior volume of the substantially rectangular storage container to create a field in which the plurality of internal magnetized substantially rectangular storage containers may be secured within the interior volume of the substantially rectangular storage container.

20. The modular container system of claim 15, wherein the third plurality of magnets are disposed in a third grid pattern such that the third grid pattern is attracted to the first grid pattern and the second grid pattern to provide a secure connection between the lid assembly and the substantially rectangular storage container when the lid assembly is placed on top of the substantially rectangular container.

* * * * *